A. WERNER.
SHAFT AND FLYWHEEL COUPLING.
APPLICATION FILED DEC. 5, 1914. RENEWED NOV. 18, 1919.
1,332,966.
Patented Mar. 9, 1920.
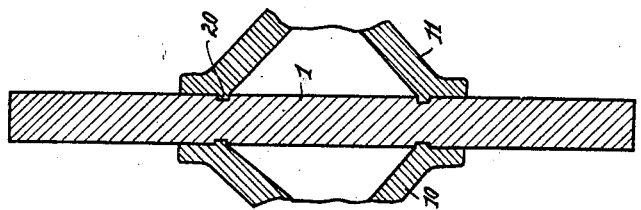
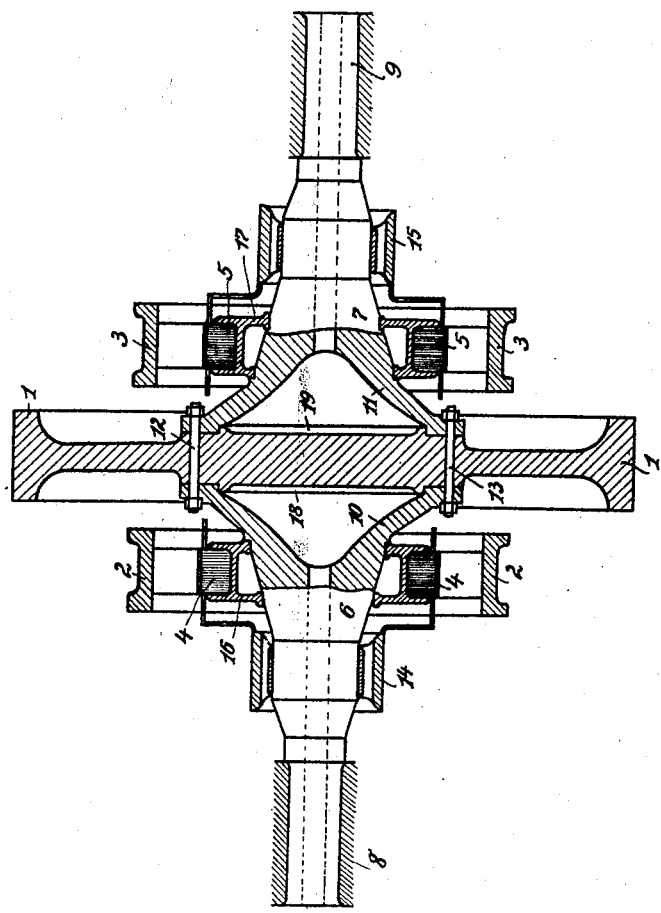

UNITED STATES PATENT OFFICE.

ALBERT WERNER, OF BERLIN-FRIEDENAU, GERMANY, ASSIGNOR TO SIEMENS-SCHUCKERTWERKE G. M. B. H., OF BERLIN, GERMANY, A CORPORATION OF GERMANY.

SHAFT AND FLYWHEEL COUPLING.

1,332,966. Specification of Letters Patent. Patented Mar. 9, 1920.

Application filed December 5, 1914, Serial No. 875,714. Renewed November 18, 1919. Serial No. 338,825.

*To all whom it may concern:*

Be it known that I, ALBERT WERNER, a subject of the King of Bavaria, and resident of Berlin-Friedenau, Germany, have invented certain new and useful Improvements in Shaft and Flywheel Couplings, of which the following is a specification.

My present invention relates to a novel construction of a fly-wheel and more particularly to an arrangement for interposing the fly-wheel between two machines for coupling the same with each other. A fly-wheel according to this invention may therefore be used in all kinds of dynamo couples, such as motor generators, fly-wheel converters, or more generally in all constructions comprising a machine coupled to a prime mover which may be a steam or gas engine or a turbine.

In fly-wheel constructions considerable care must be taken to connect the fly-wheel body with its shaft especially for great weights of the fly-wheel and high peripheral velocities. The general object of this invention is to provide a fly-wheel which enables the employment of only two bearings for the entire set of machines, to devise a construction for supporting and fastening the fly-wheel in such a manner that it will be easy to mount and dismount the same, and to avoid certain difficulties which are found in known constructions of this kind.

In the drawing I have shown my invention as being applied to an electrical fly-wheel converter comprising two dynamos, an outside bearing for each of said dynamos, and a fly-wheel interposed between the inner ends of each of the dynamo-shafts. Figure 1 is an elevation of such a fly-wheel converter and Fig. 2 shows a modified form of the fastening device for supporting the fly-wheel between the shafts of the two dynamos.

According to a known construction a central bore is provided on the fly-wheel through which a one-piece shaft is inserted, in which case of course a very thick and long shaft becomes necessary and a correspondingly large hub or central body for the wheels resulting in difficulties to adapt the interior surface of the bore of the fly-wheel to the shaft, and to properly construct the keys for fastening the fly-wheel upon the shaft. Also on account of the great length of the one-piece shaft the assembling of such a construction becomes rather inconvenient and cumbersome.

Another construction in which a single shaft construction or a through-going shaft is avoided is described for a fly-wheel converter in the German Patent No. 147,469. Here lateral supporting walls are employed at the outer part of the fly-wheel and the ends of the two shafts to be connected with the fly-wheel are mounted each in a bearing. This construction has proved to be not satisfactory on account of certain inconveniences connected with the fastening of the ends of the shafts with the lateral supporting walls. A construction of this kind will on account of the necessarily somewhat unbalanced condition of the fly-wheel and consequent knocking of the wheel soon become loose by the gradual enlargement of the bore. Also a through-going shaft would in this case not solve the difficulties but only retain the afore-mentioned disadvantages.

According to my invention the diameters of the ends of the shafts, in order to reduce the mechanical strains at this place to the smallest possible values, are gradually enlarged in the form of a bell toward the fly-wheel in such a manner that at the end of either shaft a flange of sufficiently large diameter will be provided which serves for the immediate connection with the fly-wheel. The fly-wheel 1 is interposed between the enlarged ends 10 and 11 of the shafts 6 and 7 with bearings 8 and 9 for the two dynamo-electric machines 2 and 3 whose rotors 4 and 5 shall be coupled together. The form of the enlargements 10 and 11 may of course be different from the shape of a bell; for securing a full utilization of the material and greatest possible strength the enlargements are preferably made hollow but I do not wish to confine my invention to this particular form of the enlargement. For the proper support of the fly-wheel and the connection with the bell-shaped ends of the shafts serve the bolts 12 and 13 which are arranged in sufficient number around the periphery of the bell-shaped ends of the shafts. Also for exactly centering the fly-wheel upon the shafts and for avoiding shearing forces on the bolts 12 and 13 circular projecting ledges 18 and 19 are provided laterally of the fly-wheel body, which ledges register with a correspondingly formed recess at either end of the bell-shaped ends of the shafts as indicated in Fig. 1 of the drawing. The centering and supporting means for the fly-wheel in the construction shown in Fig. 2 consist of the projecting circular ledges at the supporting faces of the bell-shaped ends of the shafts and recesses in the fly-wheel body, which register with said ledges as shown at 20. The commutators 14 and 15, or as the case may be, the slip-rings of the two dynamos, as well as the supporting rims 16 and 17 for the rotor iron are carried by the shafts in the ordinary manner. This novel arrangement has an advantage over those in which the rotor bodies are fixed between their supports and the fly-wheel, in that the bearing surfaces between rotor bodies one on the one hand and the shafts on the other hand are entirely freed from fly-wheel forces, and the only bending strain on the shafts will be exerted by the comparatively small weight of the rotors. This is likewise the case if the rotor iron is immediately mounted upon properly formed supporting surfaces of the enlarged part of the shaft, that is if the rims 16 and 17 are omitted or made integral with the shaft. In either case normally constructed rotors for the two dynamos may be used.

A thus constructed two-bearing converter permits extreme reduction of the distance between the bearings and further results in the possibility of easily and conveniently mounting or dismounting the fly-wheel by simply moving the two shafts slightly away from each other. A further important advantage of this construction consists also in that the fly-wheel proper may be constructed as a disk with a central bore which with the smallest possible strain of the material, secures the highest peripheral velocity and the best utilization of the weight of the fly-wheel.

Another advantage of this construction may be found in that the bell-shaped construction of the ends of the shaft permits a perfect working of the material of the shafts during forging and pressing, so that flaws or other defects will be easily prevented; in addition to this, the quality of the material may be exactly controlled in the finished piece by turning off both sides of the bell-body.

Having thus described my invention I claim as new and desire to secure by Letters Patent of the United States:—

1. In a fly-wheel in combination, a wheel body, two coaxial substantially bell-shaped shafts and means for fixing said shafts to said wheel body by their broad ends.

2. In a fly-wheel in combination, a wheel body, two coaxial substantially conical shafts having at the cone bases a diameter exceeding one fourth of the diameter of the wheel body and means for fixing said shafts to said wheel body by said cone bases.

3. In a fly-wheel in combination, a wheel body, two coaxial hollow substantially conical shafts and means for fixing said shafts to said wheel body by their broad ends.

4. In a fly-wheel in combination, a wheel body, two coaxial shafts, comprising each a bell-shaped part and a substantially cylindrical part and means for fixing said shafts to said wheel body by their bell-shaped parts.

5. In a fly-wheel in combination, a wheel body, two coaxial substantially bell-shaped shafts, a rotor of an electric machine on each shaft and means for fixing said shafts to said wheel body by their broad ends.

6. In a fly-wheel in combination, a wheel body, two coaxial substantially bell-shaped shafts, a rotor of an electric machine on the bell-shaped portion of each shaft and means for fixing said shafts to said wheel body by their broad ends.

7. In a fly-wheel in combination, a wheel body, two coaxial hollow substantially conical shafts, a rotor of an electric machine on each shaft and means for fixing said shafts to said wheel body by their broad ends.

8. In a fly-wheel in combination, a wheel body, two coaxial shafts each comprising a bell-shaped part and a substantially cylindrical part, a rotor of an electric machine on each bell-shaped part, and means for fixing said shafts to said wheel body by their bell-shaped parts.

In witness whereof I have hereunto set my signature in the presence of two subscribing witnesses.

ALBERT WERNER.

Witnesses:
WOLDEMAR HAUPT,
HENRY HASPER.